(12) United States Patent
Stein (10) Patent No.: US 10,703,576 B2
(45) Date of Patent: Jul. 7, 2020

(54) METHOD AND SYSTEM FOR MANUFACTURING MEDICAL POUCHES

(71) Applicant: Kiefel GmbH, Freilassing (DE)

(72) Inventor: Bernd Stein, Kirchanschoring (DE)

(73) Assignee: KIEFEL GMBH (DE)

( * ) Notice: Subject to any disclaimer, the term of this patent is extended or adjusted under 35 U.S.C. 154(b) by 513 days.

(21) Appl. No.: 15/519,285

(22) PCT Filed: Oct. 19, 2015

(86) PCT No.: PCT/DE2015/000514
§ 371 (c)(1),
(2) Date: Apr. 14, 2017

(87) PCT Pub. No.: WO2016/070863
PCT Pub. Date: May 12, 2016

(65) Prior Publication Data
US 2017/0239906 A1   Aug. 24, 2017

(30) Foreign Application Priority Data
Oct. 19, 2014  (DE) .......................... 10 2014 015 348

(51) Int. Cl.
*B65G 35/06*     (2006.01)
*B31B 70/66*     (2017.01)
(Continued)

(52) U.S. Cl.
CPC .............. *B65G 35/06* (2013.01); *B31B 50/00* (2017.08); *B31B 70/66* (2017.08); *B31B 70/84* (2017.08);
(Continued)

(58) Field of Classification Search
CPC ......... B65G 35/06; B31B 50/00; B31B 70/84; B31B 70/64; B31B 70/844;
(Continued)

(56) References Cited

U.S. PATENT DOCUMENTS 2,654,462 A * 10/1953 Guerin ............... B65G 49/0463
                                              198/346.3
3,204,756 A *  9/1965 Lesch ..................... B65B 41/04
                                              198/465.1
(Continued)

FOREIGN PATENT DOCUMENTS

DE    10-2006-004611 A2    8/2007
WO       2005095089 A1    10/2005
(Continued)

OTHER PUBLICATIONS

Written Opinion dated Apr. 14, 2016 in PCT Application PCT/DE2015/00514, 11 pages.
(Continued)

*Primary Examiner* — Nathaniel C Chukwurah
*Assistant Examiner* — Lucas E. A. Palmer
(74) *Attorney, Agent, or Firm* — Tarolli, Sundheim, Covell & Tummino LLP (57) ABSTRACT

The invention relates to a system for manufacturing medical pouches and a method for manufacturing medical pouches in a system, said pouch being made from two layers of plastic film and at least one component per pouch, the system comprising a group of positioning aids for the components as well as a group of supports for the positioning aids, the positioning aids being supported on the supports which are conveyed in an endless path with the aid of a guiding mechanism, the system further comprising a component application station designed to bring a component, which has been introduced into the station by a positioning aid with the aid of a support, into a joining connection with the plastic film. The invention is characterized in that on the endless path, the supports are alternately guided first along a process run and then along a return run; the supports are placed at a certain distance from one another in the process run, are accelerated to increase the distance therebetween when the (Continued)

supports travel along the return run, and are decelerated to reduce the distance therebetween again when the supports intermittently travel along the process run. As a result, the system requires fewer product-specific parts.

30 Claims, 6 Drawing Sheets (51) Int. Cl.
*B31B 50/00* (2017.01)
*B31B 70/84* (2017.01)
*B31B 70/64* (2017.01)
*B31B 160/10* (2017.01)

(52) U.S. Cl.
CPC ............. *B31B 70/64* (2017.08); *B31B 70/844* (2017.08); *B31B 2160/10* (2017.08)

(58) Field of Classification Search
CPC ........ B31B 2160/10; B65H 3/22; B65H 3/24; B65H 3/242; B65H 3/32; B25C 1/008
USPC .......................................................... 493/193
See application file for complete search history.

(56) References Cited

U.S. PATENT DOCUMENTS

| | | | | |
|---|---|---|---|---|
| 4,027,577 A * | 6/1977 | Thompson | ............... | B29C 65/04 493/212 |
| 4,667,804 A * | 5/1987 | Dubuit | ................ | B41F 15/0872 198/345.3 |
| 4,981,463 A * | 1/1991 | Susini | ................. | B29C 65/7802 198/468.1 |
| 5,660,264 A * | 8/1997 | van der Schoot | ..... | B65G 23/30 198/594 |
| 5,803,888 A * | 9/1998 | Severs | .................... | B29C 65/78 226/173 |
| 6,170,232 B1 * | 1/2001 | Vandegeijn | ........... | B23B 31/113 279/4.09 |
| 6,876,896 B1 * | 4/2005 | Ortiz | ........................ | B29C 65/02 318/135 |
| 7,658,275 B2 * | 2/2010 | Hayashi | .................. | B65G 35/06 198/459.8 |
| 2008/0254962 A1 * | 10/2008 | Mizuo | ..................... | B29C 65/02 493/179 |
| 2014/0138215 A1 * | 5/2014 | Anderson | .............. | B65G 17/42 198/617 |
| 2014/0244028 A1 * | 8/2014 | Giloh | ..................... | B65G 35/08 700/230 |
| 2015/0303841 A1 * | 10/2015 | Suzuki | .................... | H02P 6/006 318/38 |
| 2015/0314901 A1 * | 11/2015 | Murray | ................... | B65B 43/50 53/133.2 |
| 2016/0194157 A1 * | 7/2016 | Senn | ....................... | B65G 35/06 414/467 |

FOREIGN PATENT DOCUMENTS

| | | |
|---|---|---|
| WO | 2012006980 A2 | 1/2012 |
| WO | 2014154196 A2 | 10/2014 |

OTHER PUBLICATIONS

International Search Report dated Apr. 14, 2016 in PCT Application PCT/DE2015/00514, 7 pages.
International Preliminary Report on Patentability dated Apr. 25, 2017 in PCT Application PCT/DE2015/00514, 7 pages.

* cited by examiner

METHOD AND SYSTEM FOR MANUFACTURING MEDICAL POUCHES

CROSS REFERENCE TO RELATED APPLICATIONS

This application is a U.S. national stage application of PCT application PCT/DE2015/000514, filed Oct. 19, 2015 and claims priority to German application 10 2014 015 348.7 filed Oct. 19, 2014. The disclosures of each of the above-cited applications are incorporated herein by reference in its entirety.

FIELD OF THE INVENTION

The invention relates to a method for manufacturing medical bags in a plant and to a plant for manufacturing medical bags.

BACKGROUND OF THE INVENTION

A method and a plant for manufacturing medical bags are disclosed by EP 1 780 000 A1.

The post-published DE 10 2014 013 729.5 discloses the insertion of a film sheet into a plant for manufacturing bags.

The post-published PCT/DE2014/000153 discloses the usage of carriers which can be individually introduced into and removed from the transport path.

SUMMARY OF THE INVENTION

The invention is based on the task of creating an alternative or an improvement.

According to a first aspect of the invention, this task is solved by a method for manufacturing medical bags in a plant from two layers of plastic film and at least one component per bag, with an assemblage of positioning aids for the components and with an assemblage of carriers for the positioning aids, the positioning aids being carried by the carriers and the carriers being moved in an endless path by means of a guide, wherein the plant has a component application station adapted to couple a component, which has been placed in the station by a positioning aid by means of a carrier, with the plastic film by a joining; with the carriers being guided along an endless path; the method being characterized in that the carriers are guided on their endless path alternatingly first along a process path and subsequently along a return path, wherein the carriers have spacings in the process path, are accelerated to form larger spacings while passing through the return path and are then again braked to form smaller spacings for the intermittent passage through the process path.

DETAILED DESCRIPTION OF PREFERRED EMBODIMENTS

In the following, the terminology will be explained:

A "medical bag" is a bag to be used in the medical-technical field, for instance an infusion bag, a blood bag, a collecting bag etc.

With the typical shape of a bag, that is, with a pronounced two-dimensional shape, at least in the empty state, the two "layers of plastic film" form the top and the bottom of the bag. The two films are normally welded together so as to produce a liquid-tight bag.

It is explicitly pointed out that within the context of the present patent application, indefinite articles and numerals such as "one", "two" etc. are normally to be understood as indicating a minimum, that is "at least one . . . ", "at least two . . . " etc., unless it becomes clear explicitly or implicitly from the respective context that in this case, "exactly one . . . ", "exactly two . . . " etc. are or can be intended.

For instance, it is conceivable without any question that a medical bag can be produced from more than two layers of plastic film.

The "components" to be introduced, that is, normally at least one component per bag, can vary due to the different possible functions of the bag. In the case of a medical bag filled with an injection fluid, usually at least one port is provided. Examples of ports can be found in WO 2014/154195 A1.

The "positioning aids" can be, in a simple case, carriers which can for instance engage the components or grip a site close to the components but which are ideally always in direct connection with the respective component.

The positioning aids are carried by the "carriers", that is, they are assemblies each consisting of at least two elements.

The carriers, in turn, are moved in an "endless path" by means of a "guide". Both the guide and the endless path can be physical entities but also logical entities. A guide can be, for instance, a rail, a cable pull or the like. The endless path, on the other hand, can be a continuous path, or it can consist of different portions, and it can be controlled, for instance, mechanically or electronically.

The "component application station" can be, for example, a pre-welding station, a welding station or a post-welding station, or it can also be, of course, a combined station, for instance a combined welding and cutting station.

The "process path" has a plurality of stations.

The return path can also have one or more stations, but it will in any case have a lower density of stations, that is, less stations per path. Briefly said, a plurality of process steps take place in the process path. In the return path, either no process step takes place at all, or only preparatory and post-processing steps, such as, for instance, cleaning steps, but in any case no coupling; or a number of process steps take place in the return path which is in any case smaller than the one in the process path.

In the simplest case, the process path and the return path can be defined geometrically, that is, at least substantially as straight paths, with one reversal each taking place between the process path and the return path. The two paths can, however, be more complex, either jointly or individually.

The passage through the process path takes place intermittently. A plurality of carriers with a corresponding plurality of positioning aids move intermittently along the process path. The carriers move along the process path preferably with the same machine clock pulse.

The process path can also be defined, for instance, by the carriers having an identical feed clock pulse along the process path.

In any case, the carriers in the process path have a higher density, that is, a larger number of carriers per path. Therefore, the carriers in the process path have a small average spacing. For example, a process path can have a length of 3 m to 10 m, with approximately ten to thirty or even more carriers being located along this length while the plant is operating.

Such a plant therefore requires a large number of product-specific positioning aids.

To reduce the number of product-specific positioning aids, the carriers are accelerated after passing through the process path to form larger spacings so that they pass through the return path with a large space between them. In other words, only a small number of product-specific positioning aids with their carriers are located in the return path.

The difference in density, and thus the difference between the number of carriers in the process path and the number of carriers in the return path depends on the degree of acceleration of the carriers for the return path. In case of a very high acceleration, that is, a high speed of the carriers when they pass through the return path, it is even possible that very few or, intermittently, even not a single one carrier is located in the return path; intermittently because naturally the carriers also have to intermittently run through the return path.

To accelerate the run through the return path, it is proposed that the carriers be guided along the return path in a continuous movement.

In this connection, it is pointed out that the return path and the process path do not necessarily need to have the same length. Instead, it is also conceivable, for instance, to arrange the process path at a front side of the plant and the return path on the back side of the plant. Nevertheless, one station or the other can also be arranged on the back side of the plant, for instance to clean the positioning aids or for plugging on tubular components or ports. In this case, two different paths can be considered to be return paths in the sense of the present patent application: first, the entire return path including the individual stations arranged there, and secondly—which is more important—a path free of stations which is only intended for the return movement. The size of such a mere return path without any stations can make up more than one third, more than half, more than two thirds, more than three fourths or even a larger portion of the process path.

A geometric constellation which is particularly advantageous for the plant can be if the return path and the process path are parallel.

Since an intermittent film 47 (see FIG. 8) feed is envisaged along the process path, anyway, it is proposed that the carriers along the process path be coupled with the intermittent film feed 47 and decoupled from the intermittent film feed for the return along the return path.

In this way, the supports can be moved with high precision along the process path so that the necessary drive for the supports can simply be performed by the necessary drive for the film feed.

Nevertheless, the supports are not entirely dependent on the film feed since they are decoupled from it for the return.

Figure 8:
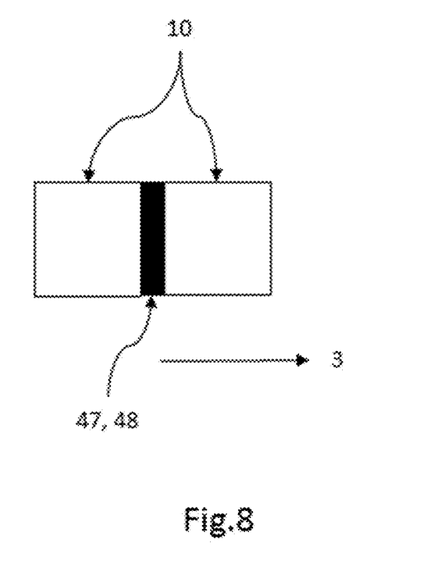
FIG. 8 is a view of the coupling of carriers to the intermittent film feed along the process path, e.g. by means of a mechanical coupling member.

Coupling of the carriers to the intermittent film 47 feed along the process path can take place by means of a mechanical coupling member 48 (see FIG. 8).

A mechanical coupling member can be driven, for instance, so that it can be moved back and forth, or it can be coupled and uncoupled in a passive manner. In a particularly simple case, the mechanical coupling member can be entrained by a catch on the drive of the intermittent film feed.

In particular, it is conceivable that the catches be fixed to a stationary circulating belt which can be driven, for instance, by a belt drive or a chain drive.

Alternatively or even additionally, it is conceivable that the supports in the process path are driven by a separate drive means for the intermittent drive and feed, especially by a motor or a permanent magnet.

A permanent magnet is suitable especially if the supports are to be moved and stopped by magnetic force.

Especially in case of a magnetic drive for the supports, it is proposed that by means of a closed-loop control, a controller checks the current positions of the driving magnetic field generators and/or the positions of the supports in the plant and adjusts them to desired values.

As a general rule, it is pointed out that within the context of the present patent application, whenever a "control" is mentioned, a "closed-loop control" is intended to be disclosed as a technically even more precise embodiment; on the other hand, when a "closed-loop control" is mentioned, a "control" is also intended to be disclosed. This applies unless it is explicitly mentioned in the respective passage that only an open-loop control or a closed-loop control are disclosed.

Figure 9:
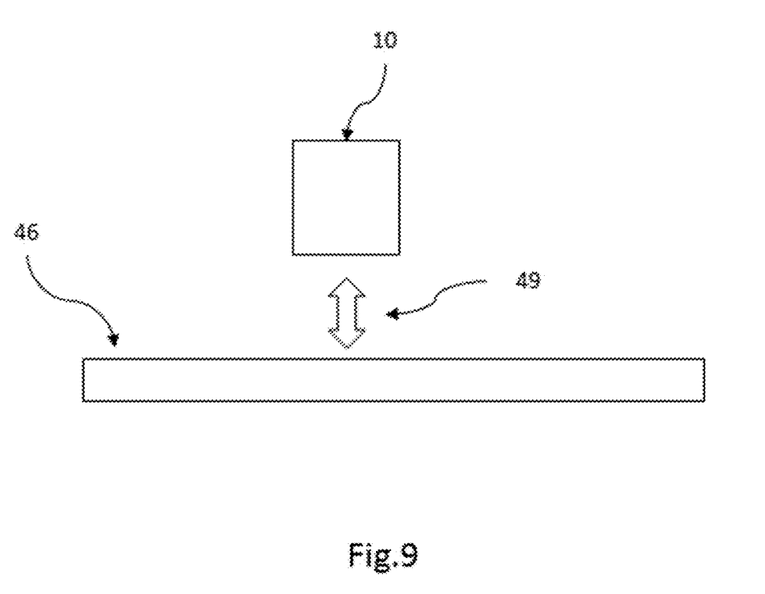
FIG. 9 is a view of supports or carriers coupled be mean of an electronic coupling.

For the process path, it is proposed that the supports be coupled by means of an electronic coupling 49 (see FIG. 9).

An electronic coupling 49 is characterized by the fact that a controller records a set position sensor, mechanically-physically or virtually, and on the other hand the coupled carrier as an actual value and adjusts them to each other.

It is also possible to control the position of a first support and to then control additional supports in relation to the first support. This type of electronic coupling is also called master-slave coupling.

The supports are preferably coupled to a virtual master via such a controller.

In such an embodiment, the position and the speed of a virtual master are controlled and a plurality of slave supports is coupled in relation to the virtual master.

The advantage of such an embodiment is that a virtual master has no inertia of masses because it lacks mass. The virtual master can therefore be controlled in position and speed with velocities and accelerations which can be as high as desired. The other, physical supports driven as slaves will then profit from the high-precision control of the virtual master.

For passing through the return path, the supports can be coupled with a mechanical system for fast transport, which comprises for instance a linear motor, a belt such as e. g. a friction belt, or a pusher. They can move the supports, especially by means of friction or positive engagement, along the return path with a much higher speed than that with which the supports move along the process path, especially including the various processing times in the stations, but ideally even faster than the supports move between the individual stations in the process path.

On a back side of the plant, with the return path preferably being arranged on the back side, cleaning of the positioning aids is particularly suitable.

As concerns the positioning aids, it is proposed that they position the components between the two layers of plastic film, and that the components are integrally connected with the two layers of plastic film by way of the coupling process in the component application station.

Thermal welding or ultrasonic welding processes are particularly suitable as coupling processes. It is therefore proposed for the components to be preheated by means of an active heater before the component application station.

When the positioning aids are rod-shaped, they are particularly well-suited for positioning and also for transporting the components. This becomes especially clear if central electrodes are used as positioning aids. These are also often called Mandrels, in praxi. A rod-shaped positioning aid, such as a Mandrel, can be axially introduced in a recess in the component which is provided for this purpose.

When the components are welding ports, tubular pieces for ports or breaking valves, they have a tubular shape anyway, independently of the cross-section of the tube, such as circular or, in particular, lozenge-shaped, or with rounded edges.

On the back side of the plant, the components can be plugged onto the central electrodes, or the positioning aids can be equipped with the components in a different manner. The back side of the plant is particularly suitable because it can also include a component feeding device which always occupies a large amount of space. Also, it normally needs to be easy to clean and therefore accessible, especially for the production of medical bags.

Figure 5:
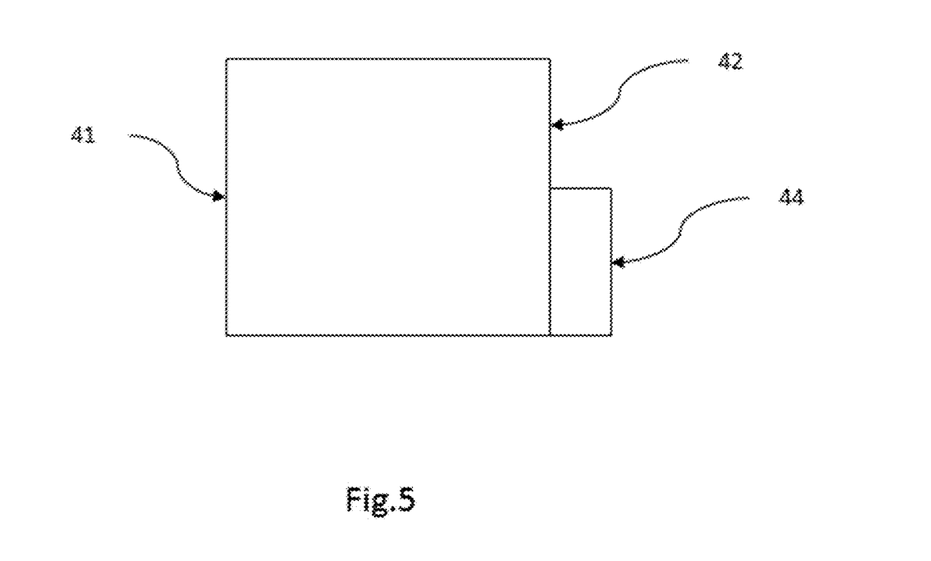
FIG. 5 is a view of a heating station arranged on the back side of the plant.

In case the components are subjected to an active preheating process by means of a passage through a heating station 44, it is proposed that this heating station 44 as well be arranged on the back side 42 of the plant 41 (see FIG. 5).

For a fast and yet precise transportation of the carriers, it is proposed that the carriers are guided in a floating manner and accommodated in the process path in stations with a centering unit each.

The floating guidance of the carriers, for instance a guidance of the carriers with a play of several millimeters, especially a play of several millimeters in different axial directions, allows a fast advance of the carriers with an inexpensive suspension or bedding. In this case, each station only has to comprise one or only a small number of centering units in order to achieve a high positioning precision of the components.

The carriers can be guided in a rail.

A large variety of rail systems is available on the market, for instance rails by the company HepcoMotion Deutschland, 90537 Feucht, Germany. The prototype of the present inventor uses a rail by this enterprise having a ground V-groove.

In a preferred embodiment, it is conceivable for the carriers to be guided in a rail along the endless path in sections and to be removed from the rail in sections, in particular for guiding a change in direction.

One concept by the inventor provides for using one linear rail each for the long-distance linear transports along the process path and along the return path in order to guide the carriers.

To guide the changes in direction, that is, to guide the two inversions of direction at the two front faces of the plant, it is preferred for the carriers to be guided out of the rails, for instance to be unthreaded, then the inversion to be performed, for example by means of an inverting station, and then for the carriers to be re-introduced into the guide of the back rail.

Of course, it is also conceivable that a rail be provided only in one of the process path and the return path.

Also, it is naturally also conceivable that only part of the process path and/or only part of the return path be provided with a rail.

According to a second aspect of the present invention, the task is solved by a method for replacing an assemblage of positioning aids to be replaced by a new assemblage of positioning aids in a plant for manufacturing medical bags, by means of the method as described above, wherein the positioning aids to be replaced are taken from the endless path and the new positioning aids are inserted in the endless path.

Such a method is especially easy to perform if the positioning aids, and in particular their carriers, are guided in rails.

It is conceivable for the positioning aids to be taken individually in succession, in groups simultaneously or all simultaneously from the endless path and preferably to be replaced in the same way.

Thus, for instance, the positioning aids can either be removed sequentially from the carriers, or the carriers together with the positioning aids can sequentially be driven to a transitory path pause area or a positioning aid replacement area.

If the carriers and the positioning aids are designed intelligently, the positioning aids can be replaced manually or even mechanically without the necessity of providing two assemblages of carriers for two assemblages of positioning aids. Instead, the preferred embodiment of the invention provides for only one assemblage of carriers in case of several assemblages of positioning aids; or two assemblages of carriers can be provided in case of at least two, preferably at least three assemblages of positioning aids.

In any case, the preferred embodiment provides for less assemblages of carriers than assemblages of positioning aids in the plant.

For replacing the positioning aids, the carriers can be substituted; or the positioning aids to be replaced can be removed from the carriers and then the new positioning aids can be plugged onto the same carriers.

If the positioning aids are to be replaced together with the carriers, it is proposed that the carriers be guided down from the endless path via a shunt and that the new positioning aids with their carriers be introduced into the endless path preferably via a separate shunt.

Figure 4:
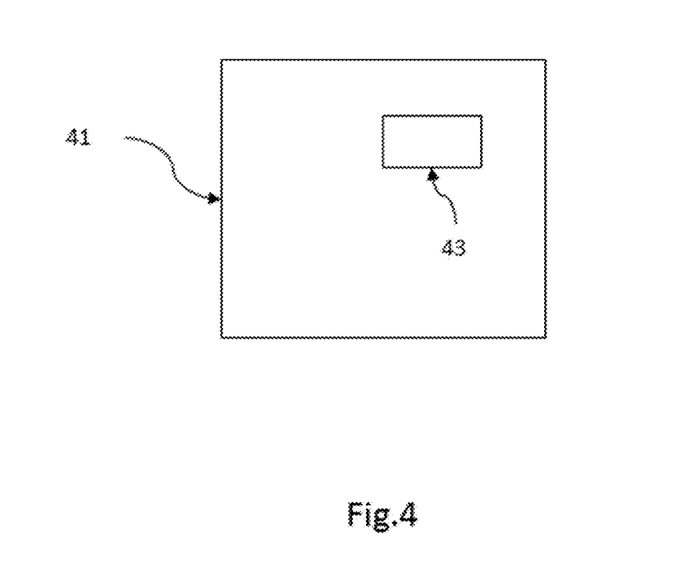
FIG. 4 is a view of a component application station of the plant.
Figure 10:
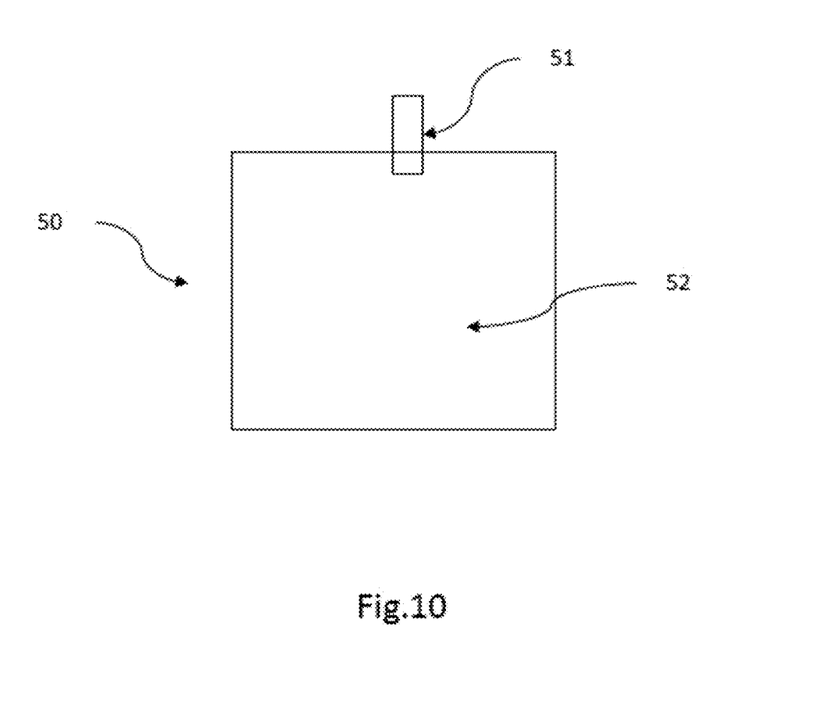
FIG. 10 is a view of a medical bag from two layers of plastic film and at least one component per bag.

In a third aspect of the present invention, the task is solved by a plant 41 (see FIGS. 4-6) for manufacturing medical bags from two layers of plastic film and at least one component 51 (see FIG. 10) per bag 50, with an assemblage of positioning aids for the components and with an assemblage of carriers for the positioning aids, the positioning aids being carried by the carriers and the plant having a guide for the carriers which is adapted to move the carriers in an endless path; wherein the plant 41 has a component application station 43 (see FIG. 4) adapted to couple a component, which has been introduced into the station by a positioning aid with the help of a carrier, with the plastic film 52; wherein the plant 41 is characterized by having a control, in particular a closed-loop control, which is operatively connected with the transport of the carriers and adapted to guide the carriers on their endless path alternatingly first along a process path and then along a return path, to accelerate them to form larger spacings when passing through the return path and to decelerate them to again form smaller spacings while intermittently passing through the process path.

It has already been explained above, with regard to the first aspect of the invention, that with such a constellation, a lower number of components of individually adapted positioning aids has to be provided than was previously necessary for the manufacturing of medical bags in the plant.

Accordingly, it is proposed for the plant to have means adapted to perform a method as described above for the first and/or the second aspect of the invention.

The carriers preferably have a pronounced two-dimensional, flat shape. This is the case if the two dimensions of the planar extension of the carrier together amount to at least three times, preferably at least five times, the thickness dimension of the carriers.

In particular, the carriers can be shaped like pucks.

A puck-like shape leaves a relatively large amount of fastening surface on its top or bottom side. To one of the two sides, therefore, the drive can be connected, for instance a catch or a coupling for a catch; on the other side, the support for the positioning aid can be arranged.

The carriers can consequently have, above all, a carrying side, with the positioning aids being carried by the carrying side of the carriers.

The guide preferably has a rail along the endless path.

Especially if a rail is provided, the guide can have a circulating transport chain.

Figure 6:
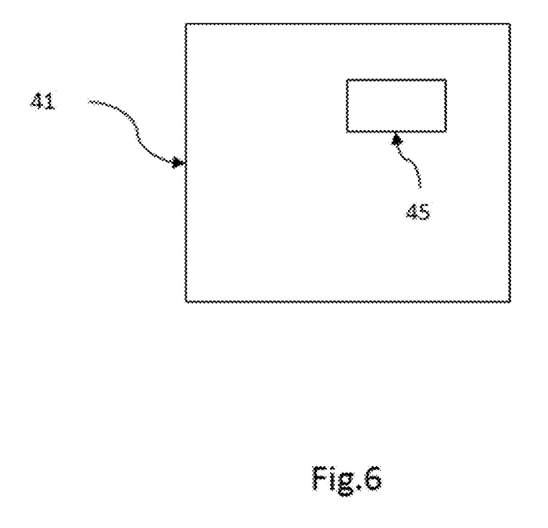
FIG. 6 is a view of a tube plug-on station of the plant.

If the plant 41 has a tube plug-in station 45 adapted to plug in one tube each on a central electrode for subsequent positioning and forming a port in the bag 50 by welding in the tube in the layers of plastic film 52, then the plant 41 corresponds to a preferred embodiment of the invention if the central electrodes are carried by supports, wherein the plant 41 has a front side, a back side 42 and two face sides in between; with the endless path extending along the front side and along the back side 42 and having a turning unit each on both face sides; wherein the front side has various stations for manufacturing and possibly for filling of the bag 50 and wherein the guide is adapted to move the central electrodes on the front side intermittently from station to station with a front side velocity and to guide a return of the supports in the direction leading toward the tube plug-in station 45 on the back side 42 (see FIG. 6).

It goes without saying that the front side velocity is to be lower than the velocity of the carriers along the back side of the plant.

It has already been mentioned that the guide can have a plurality of electronically controllable magnets, wherein the supports can be magnetically controllable and a closed-loop control is provided in the plant which adjusts the actual positions of the supports to desired positions.

Figure 11:
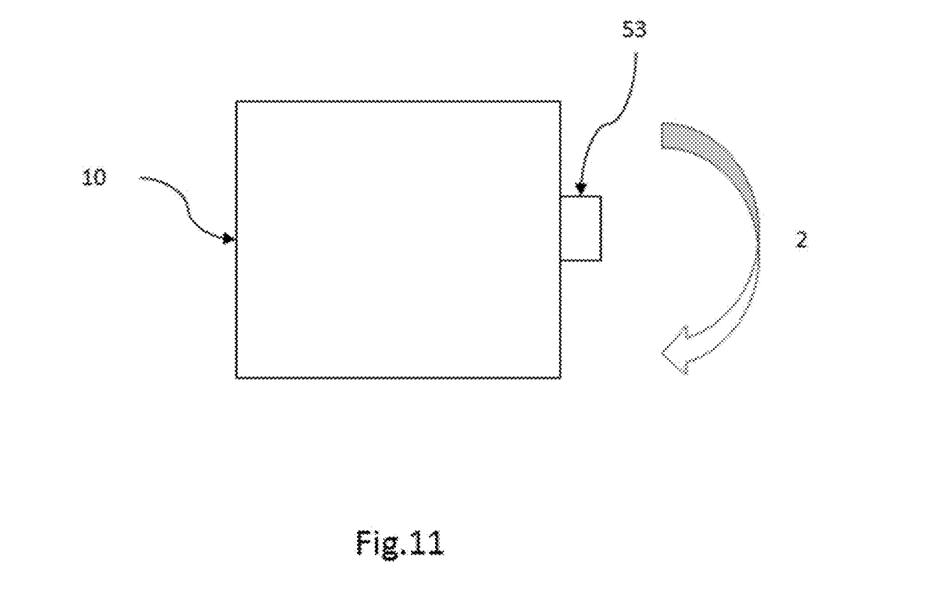
FIG. 11: supports or carriers having friction or roller bearings along the endless path.

To minimize friction loss of the supports during transport, it is proposed for the supports to have friction or roller bearings 53 along the endless path (see FIG. 11).

Each support can be in a snap-in connection with one or more positioning aids.

For having to provide only one assemblage of supports or, in any case, less supports than positioning aids, it is recommended to design the positioning aids such that they can be easily separated from the supports in a non-destructive manner. A snap-in locking can be used for this purpose. Other types of connection are naturally possible as well; the big advantage of a snap-in locking, however, is that the positioning aid and the support can be connected within a very short time; in any case faster than coupling by screws, which is also possible.

In case of a snap-in locking, but also without a snap-in locking, it is proposed to provide supports laterally to the endless path which have peg recesses for the positioning aids, the positioning aids having pegs which can be inserted in the peg recesses.

The pegs can be inserted especially in contrast to a spring tension. With such a coupling, no matter whether it is a snap-in coupling or not, the force of the spring tension retains the positioning aids within the peg recesses.

To facilitate replacement of the positioning aids, it is proposed to provide an ejector for sliding the pegs axially and in this way eject the positioning aids.

Ideally, an ejector is provided along which the positioning aids pass or which passes along the positioning aids in order to effect ejection. Alternatively, each of the supports can have an ejector.

Figure 1:
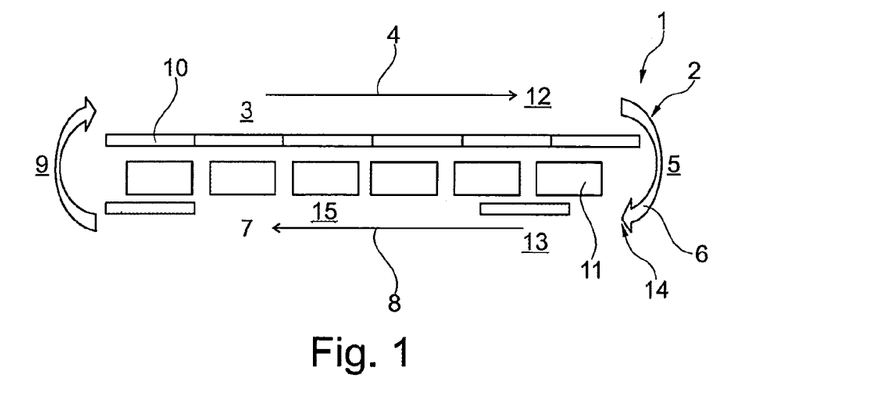
FIG. 1 is a very schematic top view of a first plant concept.

In the following, the invention will be explained in more detail by means of an example of embodiment with reference to the drawing wherein The first plant concept 1 in FIG. 1 for a plant for manufacturing medical bags moves positioning aids in the form of Mandrels which are arranged on supports and transported with the same along an endless path 2, consisting of a first linear transport along a process path 3 in a processing direction 4, then a first reversing mechanism 6 at a first face side 5, subsequently a return path 7 for a return direction 8 in rapid motion and then again a second reversing mechanism 9.

Figure 7:
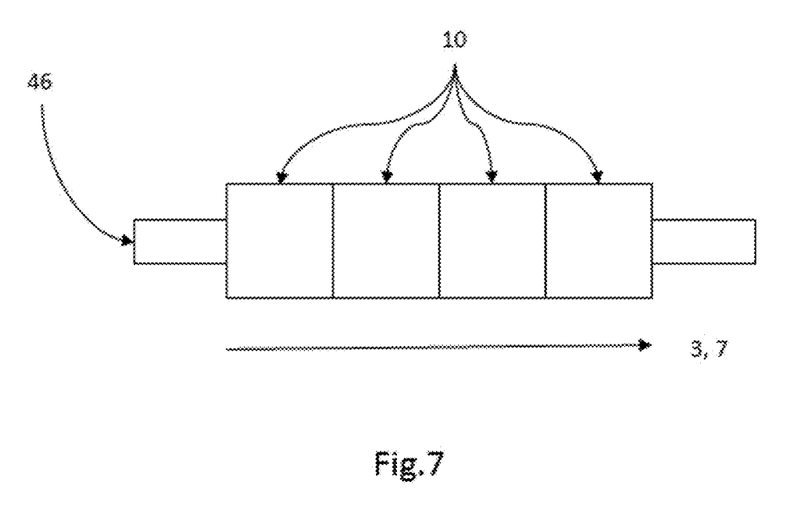
FIG. 7 is a view of carriers being transported in an endless path by a guide.

Carriers 10 formed as basic bodies (numbered by way of example, not shown in detail) are guided on one rail 46 (see FIG. 7) each in the process path 3 and in the return path 7 and laterally supported by rollers. On each of the first face side 5 and the second face side, one reversing mechanism is positioned, each embodied as a turning unit.

The supports 10 are actively advanced in the processing direction 4 by means of pushers, in synchronization with the film feed. For this purpose, the supports 10 are lined up in the processing direction 4, abutting against one another, and pushed through to the end of the process path 3, that is, to the start of the first reversing mechanism 6 at the first face side 5.

After passing through the first reversing mechanism 6, however, the supports 10 are guided back in rapid motion by means of a linear motor drive (not shown in detail, but by way of example enabled by controllable magnetic field generators 11).

Although in the first plant concept 1 shown the process path 3 and the return path 7 have the same length, that is, exactly the same length as the entire plant on its front side 12 and on its back side 13, the supports 10 in the return path 7 are accelerated in the return direction 8 such that they move away from the inlet 14 into the return path faster than additional supports 10 follow behind into the inlet 14 and into the return path after having passed through the process path 3, coming from the first reversing mechanism 6. Thus, the spacings 15 between the supports 10 are increased. In other words, in the greatly simplified concept shown, there are six supports 10 on the front side 12 in the process path 3, but only two supports 10 in the return path 7 which has the same length.

The entire necessary assemblage of product-specific supports 10 is thus substantially located in the process path 3. In other words, only a very small additional number of supports 10 is necessary in the entire endless path 2 in comparison to the one that is necessary anyway in the process path 3 for performing the joining process and other manufacturing processes.

Figure 2:
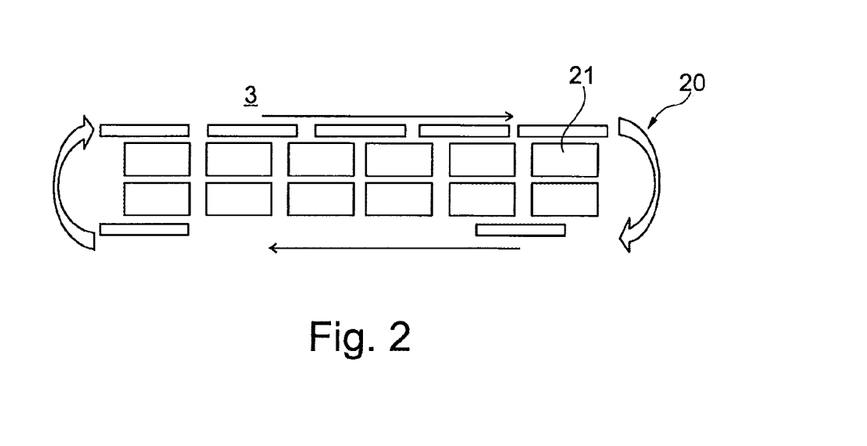
FIG. 2 is an analog view of a second plant concept.

With the second plant concept 20 in FIG. 2, the plant can basically have a structure identical to the one explained above. However, along the process path 3, an active feed is provided as well, which is here actuated by additional magnetic field generators 21 (numbered by way of example). The linear motor technology can have two primary partial lanes, one partial lane for the feed transport and one partial lane for the return transport in rapid motion.

Figure 3:
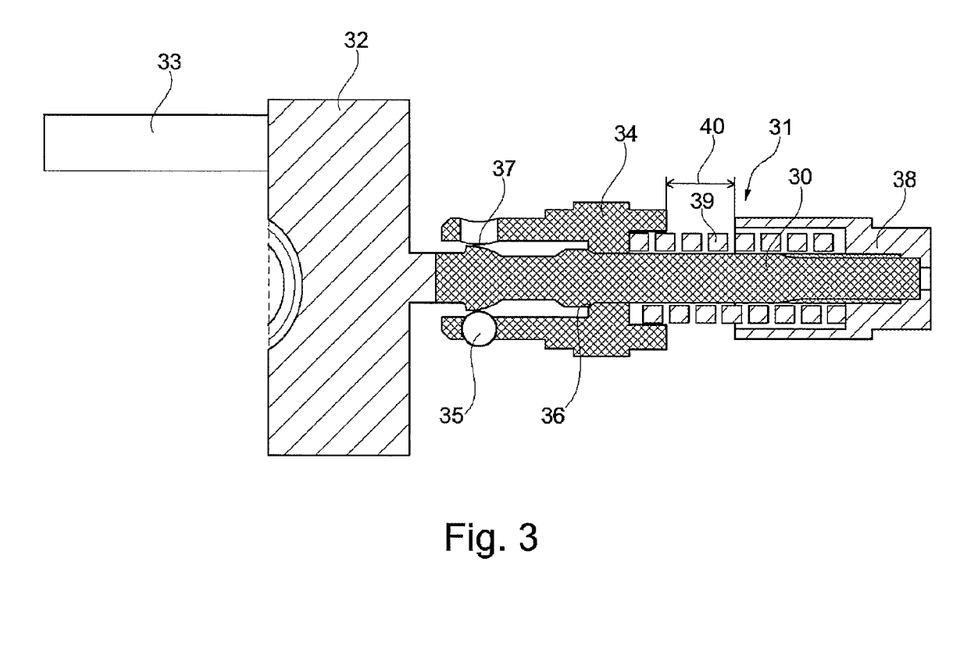
FIG. 3 is a longitudinal section of a peg for a positioning aid, clamped into a peg recess laterally to a carrier.

The peg 30 in FIG. 3 is positioned in a peg recess 31.

The peg recess 31 is designed to be fastened on the circulating side to a support (not shown). The peg recess 31 or its support, respectively, are then driven to position the positioning aid (not shown).

The peg 30 is integrally connected to the positioning aid, for instance a Mandrel support 32. The Mandrel support 32, in turn, carries a central electrode 33.

The peg recess 31 has a sleeve 34 in which a lock washer 35 is arranged so that it cannot slide.

The peg 30 has a stop shoulder 36 on one side and a spring slide shoulder 37 on the other side.

In addition, the peg recess 31 has a second sleeve 38 which axially slidable abuts against a flat spiral spring 39.

Thus, the second sleeve 38 has a play stroke 40 acting against the force of the flat spiral spring 39.

For positioning a Mandrel support 32 with its peg 30 in the peg recess 31 and thus on the support (not shown), the peg 30 is axially plugged into the peg recess 31. As soon as the spring slide shoulder 37 abuts against the lock washer 35, the force necessary for this purpose increases. This leads to an engagement of the spring slide shoulder 37 and thus of the entire peg 30 in the peg recess 31.

In this position, the Mandrel support 32 with its Mandrel 30 is integrally supported due to the geometry and the material consisting of lock washer 35 and spring slide shoulder 37.

If desired, a catch mechanism can be provided to reduce the necessary sliding force after a maximum force has been overcome. For instance, the spring slide shoulder 37 would have to be flattened again at its rear side for this purpose.

If the assemblage of Mandrel supports 32 is to be ejected from the assemblage of supports (not shown) so that a new assemblage of Mandrel supports or other positioning aids can be inserted in the peg recesses 31 in the carriers, the second sleeve 38 can be actuated against the spring force of the flat spiral spring 39, preferably mechanically. For this purpose, for instance a crank can be activated. Due to the axial movement of the second sleeve 38, the sleeve 38 will eject the peg 30 as soon as the clamping force between the spring slide shoulder 37 and the lock washer 35 has dissipated. The Mandrel supports can then easily be removed and other positioning aids can be inserted.

In other words:

The BagMaker disclosed here, that is, the plant for manufacturing bags, uses Mandrels as positioning aids. Instead of a fixed arrangement of the Mandrels on belts or chains or another type of fixed assembly, the arrangement is as follows:

The Mandrels are embodied as individual pucks or carriers movable on a more or less rigid guide (for instance, a linear guide or merely a rough guide by means of limiting plates as in a magnet drive system). The product-specific Mandrels are positioned on these carriers.

The central electrodes are either integrally screwed to the puck or fastened by means of a quick change attachment. When the specimens are exchanged, the entire support (including the guide) and the Mandrel can be removed or driven to a storage track or in a buffer storage. Or, in case of a quick change attachment, only the upper part is reclipped.

The assembly is structured like a circular flow or similar.

By the process, the carriages are pushed into the process by the film feed. To do this, the film feed couples the Mandrel support to the film feed by means of catch pins or different types of coupling members.

Returning at the end of the process is performed by an active mechanism (for instance linear motor technology, belts such as friction belts or belts with a coupling member, pushers, ... ).

In the return stroke, cleaning of the central electrodes, plugging on of tubes or ports, preheating of the same etc. can take place, as is customary.

The plant is applicable to bag manufacturing methods using high-frequency welding and thermal contact welding.

LIST OF REFERENCE NUMBERS

1 first plant concept
2 endless path
3 process path
4 processing direction
5 first face side
6 first reversing mechanism
7 return path
8 return direction
9 second reversing mechanism
10 support
11 magnetic field generator
12 front side
13 back side
14 feed into the return path
15 space
20 second plant concept
21 additional magnetic field generators
30 peg
31 peg recess
32 Mandrel carrier
33 Mandrel
34 sleeve
35 lock washer
36 stop shoulder
37 spring slide shoulder
38 second sleeve
39 flat spiral spring
40 play stroke
41 plant
42 backside of the plant
43 component application station
44 heating station
45 tube plug-on station
46 guide
47 intermittent film feed
48 mechanical coupling member
49 electronic coupling
50 bag
51 component
52 layers of plastic film
53 friction or roller bearing

The invention claimed is:

1. Method for manufacturing medical bags in a plant from two layers of plastic film and at least one component per bag, with an assemblage of positioning aids for the components, and with an assemblage of carriers for the positioning aids, the positioning aids being carried by the carriers, the carriers being transported in an endless path by means of a guide, the plant having a component application station adapted to couple by a joining the component with the plastic film, which has been placed in the station by the positioning aid by means of the carrier, with the plastic film; characterized in that the carriers on their endless path are first guided alternatingly along a process path and then along a return path, the carriers in the process path having spacings between them, wherein the carriers are accelerated in a return direction to form larger spacings from additional carriers entering the return path from the process path and from carriers entering the return path via an inlet, and wherein the carriers are decelerated again to form smaller spacings for intermittently passing through the process path.

2. Method according to claim 1, characterized in that the carriers are guided in a continuous movement along the return path.

3. Method according to claim 1, characterized in that the carriers are coupled with an intermittent film feed along the process path and decoupled from the intermittent film feed for the return along the return path.

4. Method according to claim 3, characterized in that coupling takes place by means of a mechanical coupling member.

5. Method according to claim 1, characterized in that for intermittent feed, the carriers in the process path are driven by a separate drive means, in particular by a motor or a permanent magnet.

6. Method according to claim 1, characterized in that the carriers in the process path are coupled by an electronic coupling to the guide.

7. Method according to claim 1, characterized in that for passing through the return path, the carriers are rapidly transported via a linear motor drive enabled by controllable magnetic field generators.

8. Method according to claim 1, characterized in that at a back side of the plant, the positioning aids are cleaned.

9. Method according to claim 1, characterized in that positioning aids position the components between the two layers of plastic film and the coupling process in the component application station integrally couples the components to the two layers of plastic film.

10. Method according to claim 1, characterized in that the positioning aids are rod-shaped.

11. Method according to claim 1, characterized in that the components are welding ports, tubular pieces for ports or breaking valves.

12. Method according to claim 1, characterized in that on the back side of the plant, the components are plugged onto a central electrode.

13. Method according to claim 1, characterized in that on the back side of the plant, the components are subjected to an active preheating process by means of a passage through a heating station.

14. Method according to claim 1, characterized in that the carriers are guided on a rail.

15. Method according to claim 14, characterized in that the carriers are guided on the rail along the endless path in sections and removed from the rail in sections, in particular for guiding a change in direction.

16. Method for replacing an assemblage of positioning aids to be replaced by a new assemblage of positioning aids in a plant for manufacturing medical bags by performing the method according to claim 1, wherein the positioning aids to be replaced are taken from the endless path, and the new positioning aids are introduced in the endless path.

17. Method according to claim 16, characterized in that for replacement, the positioning aids to be replaced are removed from the carriers and after that, the new positioning aids are placed onto the carriers.

18. Plant for manufacturing medical bags from two layers of plastic film and at least one component per bag, with an assemblage of positioning aids for the components, and with an assemblage of carriers for the positioning aids, where the positioning aids are carried by the carriers, the plant having a guide for the carriers which is adapted to move the carriers in an endless path, the plant having a component application station which is adapted to couple the component, which has been placed in the station by the positioning aid by means of the carrier, with the plastic film; characterized in that the plant has a controller, the controller being operatively connected to the transport of the carriers, the controller being adapted to guide the carriers on their endless path alternatingly first along a process path and then along a return path and to move the carriers in the process path in mutual spacings, wherein the controller accelerates the carriers in a return direction to form larger spacings from additional carriers entering the return path from the process path and from carriers entering the return path via an inlet, and wherein the controller decelerates the carriers to form smaller spacings for intermittently passing through the process path.

19. Plant according to claim 18, characterized in that the carriers have a pronounced two-dimensional, flat shape.

20. Plant according to claim 19, characterized in that the carriers are puck-shaped.

21. Plant according to claim 19, characterized in that the carriers have a carrying side, with the positioning aids being carried on the carrying side of the carriers.

22. Plant according to claim 18, characterized in that the guide has a rail along the endless path.

23. Plant according to claim 18, characterized in that the guide has a circulating transport chain.

24. Plant according to claim 18, characterized in that the plant has a tube plug-on station adapted to plug on one tube each on central electrodes for subsequent positioning for welding into the layers of plastic film for forming a port in the bag, wherein the central electrodes are carried by carriers, the plant having a front side, a back side and two face sides therebetween, with the endless path extending along the front side and along the back side and having one turning unit each on both face sides, the front side having different stations for manufacturing and, if desired, filling of the bag and the guide being adapted to drive, on the front side, the central electrodes intermittently from station to station with a front-side velocity and to guide on the back side a return of the carriers in the direction of the tube plug-in station.

25. Plant according to claim 18, characterized in that the guide has a plurality of electronically controllable magnets, the carriers being designed so that they can be driven magnetically.

26. Plant according to claim 18, characterized in that the carriers have a friction or roller bearing along the endless path.

27. Plant according to claim 18, characterized in that each of the carriers has a snap-in coupling with the positioning aid.

28. Plant according to claim 18, characterized in that carriers are provided alongside the endless path which have a peg recess for the positioning aids, the positioning aids having pegs which can be inserted in the peg recesses.

29. Plant according to claim 28, characterized in that the pegs are inserted in the peg recesses in contrast to a spring tension.

30. Plant according to claim 28, characterized in that an ejector is provided for displacing the pegs axially and in this manner eject the positioning aids.

\* \* \* \* \*